Figure 1:
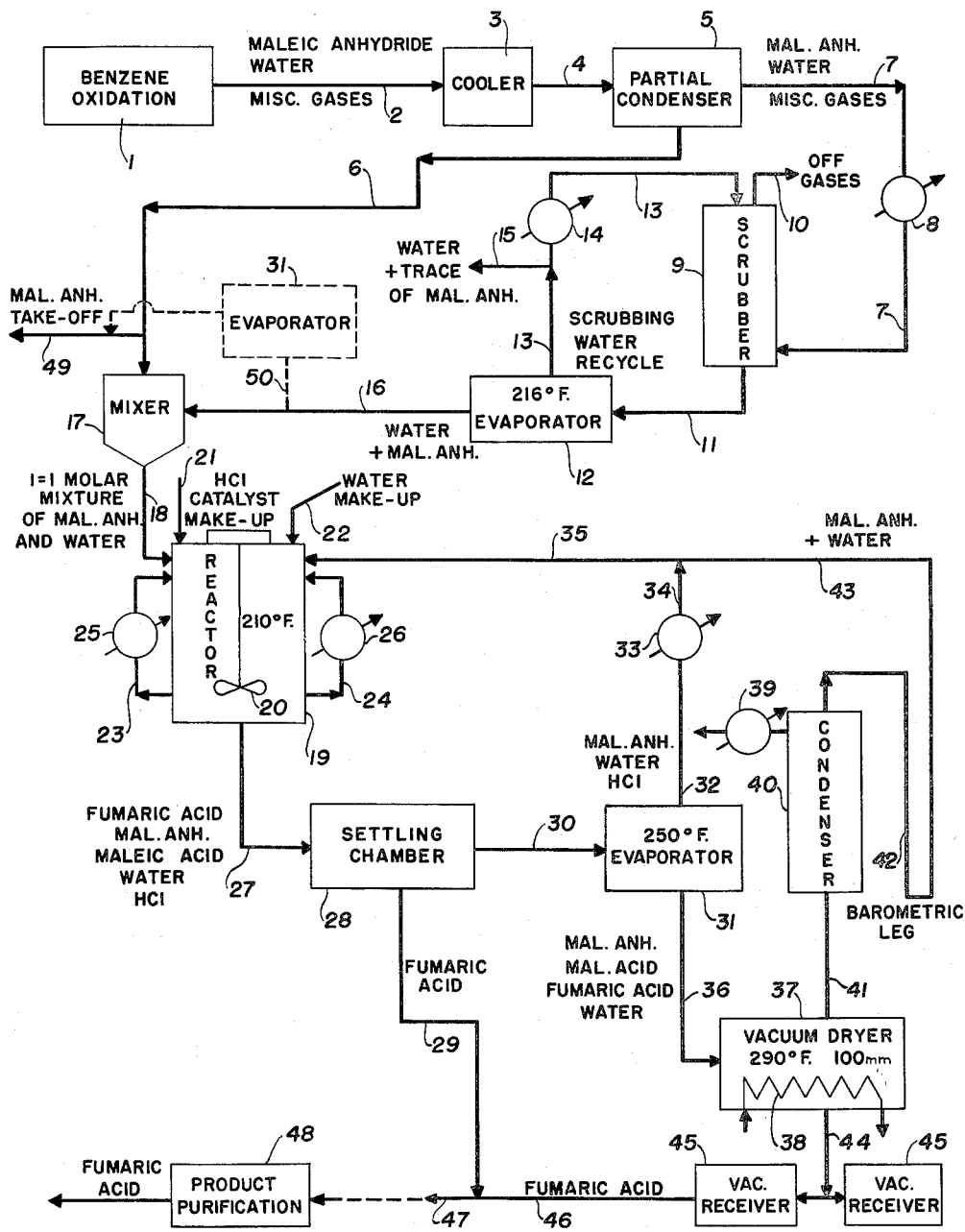

March 13, 1962 H. A. LINDAHL ETAL 3,025,321
PROCESS OF PREPARING FUMARIC ACID
Filed Sept. 11, 1957

INVENTORS
HAROLD A. LINDAHL
HARVEY HENNIG
BY
*Edward H Lang*
ATTORNEY

United States Patent Office 3,025,321
Patented Mar. 13, 1962

3,025,321
PROCESS OF PREPARING FUMARIC ACID
Harold A. Lindahl, Elmhurst, and Harvey Hennig, Crystal Lake, Ill., assignors to The Pure Oil Company, Chicago, Ill., a corporation of Ohio
Filed Sept. 11, 1957, Ser. No. 683,247
8 Claims. (Cl. 260—533)

This invention relates to new and useful improvements in processes for the preparation of fumaric acid and more particularly to an integrated process for the catalytic oxidation of aromatic compounds, such as benzene, followed by conversion of the maleic anhydride product to maleic acid and simultaneous isomerization to fumaric acid, with quantitive recovery of the product, fumaric acid.

In the past, fumaric acid has been made by isomerization of maleic acid in the presence of an acid catalyst. Previous methods of preparation, however, have required the use of relatively pure maleic acid as a starting material.

It is therefore one object of this invention to provide a new and improved process for the preparation of fumaric acid.

Another object of this invention is to provide a process for the preparation of fumaric acid from crude maleic anhydride produced by the catalytic oxidation of aromatic compounds, such as benzene.

A feature of this invention is the provision of an improved, integrated process for preparation of fumaric acid in which the reaction products from the catalytic oxidation of aromatic compounds, such as benzene, including crude maleic anhydride, are processed to produce maleic acid which is isomerized to fumaric acid.

Another feature of this invention is the provision of an integrated process for the preparation of fumaric acid from the oxidation products produced by catalytic oxidation of benzene, in which maleic anhydride and water in a 1:1 molar ratio are separated from said oxidation products and are reacted in a large volume of water in the presence of an acid catalyst to form a precipitate of fumaric acid.

Other objects and features of this invention will become apparent, from time to time, throughout the specification and claims, as hereinafter related.

In the accompanying drawing, there is shown a flow diagram of the improved process for preparation of fumaric acid, which constitutes this invention.

This invention is based upon the discovery of an improved sequence of process steps for producing fumaric acid in high yield and purity. In this process an aromatic compound, such as benzene, is catalytically oxidized at 900°–1000° F. over a vanadium oxide catalyst to produce a mixture of maleic anhydride, water, and small amounts of carbon dioxide, maleic acid, and fumaric acid. In this oxidation any suitable oxidation catalyst, such as vanadium oxide, molybdenum oxide, etc., which is well known in the art for oxidizing benzene to maleic anhydride, may be used. The mixture of gases produced in the catalytic oxidation is cooled and subjected to a partial condensation, in which the major portion of the maleic anhydride is condensed and recovered as a dry product. The effluent from the partial condensation is passed to a water scrubber which removes from the gaseous mixture substantially all of the remaining maleic anhydride. The carbon dioxide and other gases from the oxidation step are vented from the scrubber. The solution of maleic anhydride from the scrubber is then passed to an evaporator where water is evaporated, condensed, and recycled to the scrubber. Enough of the water from the oxidation step, which was condensed in the scrubber, is vented from the evaporator to leave a residue of water and maleic anhydride which, when mixed with the maleic anhydride from the partial condensation step, will produce a 1:1 molar mixture of maleic anhydride and water. The 1:1 molar mixture of maleic anhydride and water is then passed to a reactor which contains a large excess of water, sufficient to dissolve all of the maleic anhydride. An acid isomerization catalyst, such as hydrogen chloride, hydrogen bromide, or a mixture of $SO_2$ and $H_2S$, is introduced into the reactor and promotes the isomerization of maleic acid to fumaric acid. In this reactor the maleic anhydride and water first react to form maleic acid, which is then isomerized to fumaric acid. The maleic anhydride and maleic acid are completely soluble in the amount of water present in the reactor, while the fumaric acid product is substantially insoluble and precipitates to form a slurry. The slurry of water, unreacted maleic anhydride, maleic acid, and fumaric acid is then withdrawn from the reactor and passed to a settling chamber where the solid fumaric acid is allowed to settle. The liquor and some of the solid (suspended) fumaric acid are withdrawn from the settling chamber and passed to an evaporator where the water, unreacted maleic anhydride, and acid catalyst are evaporated and recycled to the isomerization reactor. The residue from the evaporator is fumaric acid which is withdrawn to a dryer where the last traces of water are removed by vacuum drying. The fumaric acid from the dryer is then removed, together with the fumaric acid recovered from the settling chamber, and subjected to further purification by recrystallization, sublimation, or the like. In this process it is most important that the excess water from the mixture of reaction products obtained in the benzene oxidation be removed prior to the isomerization reaction so that the mixture of maleic anhydride and water entering the isomerization reactor are in the 1:1 molar ratio required to produce maleic and fumaric acids. The removal of the water prior to the isomerization reaction is essential to simplify product purification and avoid azeotrope formation. In this process it is much easier to remove water from admixture with maleic anhydride than to fractionally separate maleic anhydride, maleic acid, fumaric acid, and water which are the products from the isomerization reaction.

Referring now to the accompanying flow diagram, there will be described a complete specific operating embodiment of this invention. This process is preferably operated in conjunction with a process for the preparation of maleic anhydride by catalytic oxidation of benzene. This process may be considered as being made up of three processing sections:

(1) the benzene oxidation section,
(2) the feed preparation, or water adjustment section, and;
(3) the conversion and product recovery section.

The benzene oxidation section includes a reactor 1 in which benzene vapor and oxygen, or air, are reacted over a vanadium oxide oxidation catalyst. In this reactor the benzene is oxidized to produce maleic anhydride, water, and small amounts of carbon dioxide, maleic acid, and fumaric acid. If the conversion were only to maleic anhydride, the water/anhydride mol ratio in the reaction effluent would be 2:1. However, complete oxidation of part of the benzene to carbon dioxide and water raises this ratio to about 2.5:1. Since, in this process, it is desirable that maleic anhydride and water enter the isomerization reactor in a mol ratio of 1:1, the water adjustment section is provided. In the benzene oxidation section, in a typical run, 550 lbs. of benzene are oxidized to produce 681 lbs. of maleic anhydride and 311 lbs. water, together with miscellaneous by-product gases. The gaseous mixture of maleic anhydride, water, and by-product gases are withdrawn through line 2 to cooler 3 and then through line 4 to partial condenser 5. In partial condenser 5 the mixture of gaseous reaction products is further cooled and about 90% (609 lb.) of the maleic anhydride is condensed and withdrawn through line 6 as a dry product. The effluent from the partial condenser consists of a mixture of 72 lbs. of maleic anhydride, 311 lbs. of water, and the miscellaneous by-product gases, and is withdrawn through line 7 and heat exchanger 8 to water scrubber 9.

In scrubber 9 the gaseous materials are contacted with water which dissolves the maleic anhydride, and traces of maleic acid and fumaric acid present, allowing the carbon dioxide and other by-product (non-condensible) gases to be vented through off-gas vent 10. The water solution of maleic anhydride, and traces of maleic acid and fumaric acid, leaves scrubber 9 through line 11 and flows to evaporator 12 which is maintained at about 216° F. The solution entering evaporator 12 consists of about 800 lbs. of scrubbing water and condensed water from the benzene oxidation products, and about 80 lbs. of maleic anhydride. In evaporator 12 the major portion of the water and a small amount of maleic anhydride are removed in the overhead vapors flowing through line 13 and condenser or heat exchanger 14 for recycle to scrubbing tower 9. The vapors removed overhead from evaporator 12 consist of a mixture of 675 lbs. of water and 11 lbs. of maleic anhydride. A portion of the water and maleic anhydride vapors from evaporator 12 are withdrawn through line 15 so that only enough water is recycled to scrubber 9 to provide the desired scrubbing action; 176 lbs. of water and 3 lbs. of maleic anhydride are withdrawn through line 15 and the remainder condensed and recycled as previously described. In evaporator 12 enough water is removed from the water-maleic anhydride mixture to provide a mixture which, on mixing with the water-free maleic anhydride of line 6, will produce a feed stream containing 1 mol of maleic anhydride per mol of water. The water-maleic anhydride mixture from evaporator 12 is withdrawn through line 16 and joins maleic anhydride from line 6 in mixer 17, which discharges a 1:1 molar mixture of maleic anhydride and water through line 18 to isomerization reactor 19. The mixture from evaporator 12 in line 16 consists of 125 lbs. of water and 69 lbs. of maleic anhydride which, when mixed with the 609 lbs. of maleic anhydride in line 6, provides a feed stream consisting of 678 lbs. of maleic anhydride and 125 lbs. of water flowing to reactor 19.

Reactor 19 is provided with a suitable agitator 20 for insuring complete mixing of reactants. The hydrogen chloride catalyst which is used in the isomerization reaction is supplied through inlet line 21. The HCl supplied at this point is in an amount (26.6 lbs.) sufficient to initiate the isomerization reaction and subsequently to make up for losses in the recycling of the catalyst. Reactor 19 is also provided with a water inlet line 22 which provides for fine adjustment of the ratio of water to maleic anhydride in the reactor (and may use water from line 15). In reactor 19 the 1:1 molar mixture of maleic anhydride and water is mixed with a very large excess of water, sufficient to dissolve all of the maleic anhydride, to provide a homogeneous reaction system. The reactor is initially heated to 210° F. and is maintained at substantially constant temperature by circulating cooling water through lines 23 and 24 and heat exchangers 25 and 26 (to remove the heat of isomerization). In reactor 19 the maleic anhydride is hydrolyzed to form maleic acid and isomerized under the influence of the HCl catalyst to produce fumaric acid. The hydrolysis reaction requires a 1/1 molar ratio of maleic anhydride to water, and as previously pointed out, it is the function of evaporator 12 to adjust the water content of stream 16 such that, after combination with stream 6, a 1:1 mol ratio will exist in stream 18 leading to reactor 19. The hydrolysis of maleic anhydride to maleic acid and the isomerization of maleic acid to fumaric acid are both exothermic reactions and thus necessitate the use of cooling water lines 23 and 24 and heat exchangers 25 and 26. Since fumaric acid is solid and only slightly soluble in water at the reaction temperature, most of it forms as a finely divided precipitate in reactor 19.

A slurry of fumaric acid in water containing dissolved fumaric acid, maleic anhydride, maleic acid and HCl is withdrawn through line 27 to settling chamber 28. The slurry in this run consists of 1880 lbs. of water, 451 lbs. of maleic anhydride and 26.6 lbs. of HCl, in solution, 42 lbs. of maleic acid, and 803 lbs. of fumaric acid. The major portion of the fumaric acid and maleic acid are present as finely divided solids in this slurry. In settling chamber 28 a major portion (435 lbs.) of the fumaric acid settles and is withdrawn through line 29. The reaction liquor and suspended solids (fumaric and maleic acids) are then withdrawn from settling chamber 28 through line 30 to evaporator 31 for separation of the remainder of the fumaric acid. Evaporator 31 is operated at 250° F. and effects the removal of substantially all of the maleic anhydride and water. The very large amount of water evaporated in the evaporator 31 maintains a sufficiently low partial pressure of maleic anhydride to permit its evaporation along with the water without decomposing the fumaric acid present. The vapor from evaporator 31 is withdrawn overhead through line 32, condensed by heat exchanger 33, and recycled through line 34 to line 35 leading back to reactor 19. The vapors removed overhead from evaporator 31 consist of 1874 lbs. of water, 26.6 lbs. of HCl, and 413 lbs. maleic anhydride. The residue from evaporator 31 is withdrawn as a liquid through line 36 to vacuum dryer 37. This liquid residue consists of 6 lbs. of water, 38 lbs. of maleic anhydride, 368 lbs. of fumaric acid and 42 lbs. of maleic acid.

Dryer 37 is preferably an indirect dryer, heated by steam coil 38, and is maintained at a temperature of 290° F. The pressure in dryer 37 is maintained at 100 mm. by a steam ejector 39 connected to condenser 40. In dryer 37 most of the water and maleic anhydride are driven off and most of the maleic acid is decomposed to maleic anhydride and water and removed overhead. The vapors from vacuum dryer 37 are removed over head through line 41 to condenser 40 and removed through barometric leg 42 and line 43 to join line 35 for recycle to reactor 19. The vapors removed overhead from dryer 37 consist of 12 lbs. of water (partially derived from decomposition of maleic acid) and 74 lbs. of maleic anhydride. The residue from vacuum dryer 37 is removed through line 44 to either of two alternate vacuum receivers 45. The product recovered from dryer 37 consists of about 368 lbs. of crude fumaric acid. The fumaric acid withdrawn from vacuum receivers 45 flows through line 46 and joins fumaric acid from line 29 to flow through line 47 to storage. The product sent to storage through line 47 consists of 763 lbs. of fumaric acid and about 40 lbs. of contaminants consisting of water, maleic anhydride, and maleic acid. If desired, this fumaric acid may be subjected to a further purification step shown diagrammatically as 48. This final purification of the fumaric acid may be carried out utilizing any standard physical separation technique. A preferred method of purifying the fumaric acid is by vacuum sublimation. In the present process, when the fumaric acid from line 47 is subjected to vacuum sublimation, a high purity product is obtained.

Since this process for the preparation of fumaric acid is operated in conjunction with the production of maleic anhydride, the system is provided with take-off line 49 from line 6 for removal of maleic anhydride product as desired. When maleic anhydride is taken off through line 49, it may be necessary to circulate part of the water-maleic anhydride mixture from line 16 through line 50 to auxiliary evaporator 51 which removes additional amounts of water and maleic anhydride to maintain the feed stream to reactor 19 in proper balance. This arrangement permits a completely versatile and flexible variation of the system for production of either fumaric acid or maleic anhydride in any desired proportions.

The foregoing description of this process as applied to the particular set of operating conditions used should be considered only as illustrative of this invention and not necessarily limiting the invention to the specific conditions described. This process is obviously not limited to the production of fumaric acid from the oxidation products of benzene, alone, but may be applied equally to the conversion of maleic anhydride which is obtained as the primary reaction product from the oxidation of any aromatic compound. Other aromatic compounds, such as naphthalene, toluene, xylene, and derivatives thereof may be oxidized, under proper conditions, to produce maleic anhydride, water, and carbon dioxide as the primary reaction products. The acid catalyst concentration in the reactor 19 may be varied from about 5 to 15% by weight of the reactants. The catalyst which may be used is not limited to hydrochloric acid, since numerous catalysts are known for the isomerization of maleic acid to fumaric acid. Other known isomerization catalysts include other hydrogen halides, such as HBr, $H_2S$—$SO_2$ mixtures, iodine, etc. When other catalysts are used, the operating conditions will obviously have to be varied somewhat to insure proper recycle of the catalysts.

Having thus described this invention fully and completely, including a preferred specific operating embodiment thereof, we wish it understood that within the scope of the appended claims this invention may be practiced otherwise than as specifically described.

What is claimed is:

1. In a method of preparing fumaric acid by catalytically oxidizing an aromatic hydrocarbon to produce a mixture of maleic anhydride, water, and by-product gases, recovering the maleic anhydride, hydrating the maleic anhydride to maleic acid, and isomerizing the maleic acid to fumaric acid, the improvement of cooling and condensing from the mixture of aromatic compound oxidation products the major proportion of the maleic anhydride therein, evaporating a major proportion of the water from the remainder of said mixture and remixing the residue with the condensed maleic anhydride to produce a 1:1 molar mixture of maleic anhydride and water, mixing the maleic anhydride-water mixture in a reactor with a large additional amount of water sufficient to dissolve substantially all of said maleic anhydride and to provide sufficient water to effect steam distillation of unreacted maleic anhydride in a subsequent step at a temperature substantially below that at which fumaric acid is decomposed, at a temperature sufficient to effect the conversion to maleic acid, and in the presence of a fumaric acid isomerization catalyst, to form fumaric acid and to precipitate the major portion thereof, separating the precipitated fumaric acid, distilling the isomerization catalyst and unreacted maleic anhydride from the fumaric acid in the reaction liquor by steam distillation using the water of said reaction liquor, at a temperature below the thermal decomposition temperature of fumaric acid, and recycling the water, unreacted maleic anhydride, and catalyst through the isomerization reactor, and vacuum drying and recovering the fumaric acid residue from said steam distillation step.

2. In a method of preparing fumaric acid by catalytically oxidizing benzene to produce a mixture of maleic anhydride, water, and by-product gases, recovering the maleic anhydride, hydrating the maleic anhydride to maleic acid, and isomerizing the maleic acid to fumaric acid, the improvement of subjecting the mixture of benzene oxidation products to cooling and partial condensation to condense the major proportion of said maleic anhydride therefrom, passing the gaseous effluent from the partial condensation to a water scrubber to dissolve the remaining maleic anhydride and vent the by-product gases, the maleic anhydride being removed from said scrubber as an aqueous solution and passed to an evaporator, evaporating a major portion of the water and a minor portion of the maleic anhydride from said solution, leaving sufficient water to form a 1:1 molar mixture of maleic anhydride and water when mixed with the condensed maleic anhydride, condensing and recycling as much of the evaporated water as is needed to the scrubber, mixing water and maleic anhydride from the evaporator with the condensed maleic anhydride to produce a 1:1 molar mixture, passing said mixture of water and maleic anhydride to a reactor containing sufficient water to dissolve substantially all of the maleic anhydride and to provide sufficient water to effect steam distillation of unreacted maleic anhydride in a subsequent step at a temperature substantially below that at which fumaric acid is decomposed, introducing into said reactor 5 to 15% by weight of reactants of a volatile fumaric acid isomerization catalyst, maintaining the aqueous reaction mixture in said reactor at a temperature sufficient to form maleic acid and to isomerize the same to fumaric acid to produce a precipitate of fumaric acid and an aqueous solution of fumaric acid, maleic acid, maleic anhydride, and catalyst, separating and recovering the fumaric acid precipitate in a settling chamber, passing the liquid effluent from the settling chamber to an evaporator and evaporating off the maleic anhydride and catalyst by steam distillation using the water from said reactor at a temperature below the thermal decomposition temperature of fumaric acid and recycling unreacted maleic anhydride, water, and catalyst to the isomerization reactor, and removing the fumaric acid residue from the evaporator, and vacuum drying and recovering the same.

3. A method according to claim 1 in which the portion of the initial reaction mixture, after condensing maleic anhydride therefrom, is scrubbed with water to dissolve the remaining maleic anhydride, and the by-product gases are vented, prior to evaporation of the water to produce the 1:1 molar mixture of maleic anhydride and water.

4. A method according to claim 3 in which a solution of maleic anhydride is removed from the scrubbing step, enough water is evaporated therefrom to produce said 1:1 molar mixture of water and maleic anhydride upon mixing with the condensed maleic anhydride, and the evaporated water is condensed and recycled to the scrubbing step.

5. A method according to claim 2 in which said catalyst is selected from the group consisting of iodine, hydrogen chloride, hydrogen bromide, and hydrogen sulfide-sulfur dioxide mixtures.

6. A method according to claim 5 in which the second evaporator is operated at about 250° F. and the vacuum dryer is operated at about 290° F. and 100 mm. pressure.

7. A method according to claim 5 in which apart of the water and maleic anhydride removed from the first evaporator is supplied to said reactor for fine adjustment of the water ratio therein.

8. A method according to claim 5 in which the gaseous mixture of benzene oxidation products has a water to maleic acid mol ratio of 2.0–2.5:1.

References Cited in the file of this patent

UNITED STATES PATENTS

| | | |
|---|---|---|
| 2,393,352 | Winstrom | Jan. 22, 1946 |
| 2,483,576 | De Vegvar | Oct. 4, 1949 |
| 2,784,224 | Dobratz | Mar. 5, 1957 |
| 2,863,880 | Kohn | Dec. 9, 1958 |